United States Patent
Gass et al.

(10) Patent No.: US 7,353,737 B2
(45) Date of Patent: Apr. 8, 2008

(54) MITER SAW WITH IMPROVED SAFETY SYSTEM

(75) Inventors: Stephen F. Gass, Wilsonville, OR (US); J. David Fulmer, Tualatin, OR (US)

(73) Assignee: SD3, LLC, Tualatin, OR (US)

( * ) Notice: Subject to any disclaimer, the term of this patent is extended or adjusted under 35 U.S.C. 154(b) by 407 days.

(21) Appl. No.: 11/098,984

(22) Filed: Apr. 4, 2005

(65) Prior Publication Data

US 2005/0178259 A1    Aug. 18, 2005

Related U.S. Application Data

(63) Continuation of application No. 10/932,339, filed on Sep. 1, 2004, and a continuation of application No. 10/643,296, filed on Aug. 18, 2003, and a continuation of application No. 10/052,806, filed on Jan. 16, 2002, now Pat. No. 6,880,440, and a continuation of application No. 10/051,782, filed on Jan. 15, 2002, now Pat. No. 6,877,410, and a continuation of application No. 10/047,066, filed on Jan. 14, 2002, now Pat. No. 6,945,148, and a continuation of application No. 09/929,238, filed on Aug. 13, 2001.

(51) Int. Cl.
    *B27B 13/00*    (2006.01)
    *B23D 19/00*    (2006.01)

(52) U.S. Cl. .................. 83/62.1; 83/58; 83/DIG. 1; 83/397.1; 83/478; 83/490; 83/581; 83/471.3

(58) Field of Classification Search ............... 83/397.1, 83/62.1, 58, DIG. 1, 471.3, 477.1, 490, 581, 83/471.2, 482, 487, 546, 590, 665, 523.12, 83/72, 526, 76.8, 491, 544, 485, 397, 478; 144/384, 351, 427, 154.5; 411/2, 34, 250; 292/250; 307/142, 116, 123
See application file for complete search history.

(56) References Cited

U.S. PATENT DOCUMENTS 146,886 A    1/1874    Doane et al.

(Continued)

FOREIGN PATENT DOCUMENTS

GB    1132708    11/1968

OTHER PUBLICATIONS

Skil Model 3400-Type 1 10" Table Saw Parts List and Technical Bulletin, S-B Power Tool Company, Jun. 1993.

(Continued)

*Primary Examiner*—Alie Ghassem

(57) ABSTRACT

A miter saw is disclosed having a base, a blade supported by the base, a detection system adapted to detect a dangerous condition between a person and the blade, and a reaction system associated with the detection system to cause a predetermined action to take place upon detection of the dangerous condition. The blade is rotatable, and moves into a cutting zone to cut a workpiece. The predetermined action may be to stop the blade from rotating, to create an impulse against movement of the blade into the cutting zone, or to cause the blade to move away from the cutting zone.

9 Claims, 9 Drawing Sheets

U.S. PATENT DOCUMENTS

| | | |
|---|---|---|
| 162,814 A | 5/1875 | Graves et al. |
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,464,924 A | 8/1923 | Drummond |
| 1,465,224 A | 8/1923 | Lantz |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,590,988 A | 6/1926 | Campbell |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,701,948 A | 2/1929 | Crowe |
| 1,711,490 A | 5/1929 | Drummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Drummond |
| 2,020,222 A | 11/1935 | Tautz |
| 2,038,810 A | 4/1936 | Tautz |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,452,589 A | 11/1948 | McWhirter et al. |
| 2,466,325 A | 4/1949 | Ocenasek |
| 2,496,613 A | 2/1950 | Wooward |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al. |
| 2,758,615 A | 8/1956 | Mastriforte |
| 2,785,710 A | 3/1957 | Mowery, Jr. |
| 2,786,496 A | 3/1957 | Eschenburg |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,883,486 A | 4/1959 | Mason |
| 2,894,546 A | 7/1959 | Eschenburg |
| 2,913,025 A | 11/1959 | Richards |
| 2,913,581 A | 11/1959 | Simonton et al. |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vikaitis |
| 2,984,268 A | 5/1961 | Vuichard |
| 2,991,593 A | 7/1961 | Cohen |
| 3,005,477 A | 10/1961 | Sherwen |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al. |

| | | | | | |
|---|---|---|---|---|---|
| 3,047,116 A | 7/1962 | Stiebel et al. | 4,007,679 A | 2/1977 | Edwards |
| 3,085,602 A | 4/1963 | Gaskell | 4,016,490 A | 4/1977 | Weckenmann et al. |
| 3,105,530 A | 10/1963 | Peterson | 4,026,174 A | 5/1977 | Fierro |
| 3,129,731 A | 4/1964 | Tyrrell | 4,026,177 A | 5/1977 | Lokey |
| 3,163,732 A | 12/1964 | Abbott | 4,029,159 A | 6/1977 | Nymann |
| 3,184,001 A | 5/1965 | Reinsch et al. | 4,047,156 A | 9/1977 | Atkins |
| 3,186,256 A | 6/1965 | Reznick | 4,048,886 A | 9/1977 | Zettler |
| 3,207,273 A | 9/1965 | Jurin | 4,060,160 A | 11/1977 | Lieber |
| 3,213,731 A | 10/1965 | Renard | 4,070,940 A | 1/1978 | McDaniel et al. |
| 3,224,474 A | 12/1965 | Bloom | 4,075,961 A | 2/1978 | Harris |
| 3,232,326 A | 2/1966 | Speer et al. | 4,077,161 A | 3/1978 | Wyle et al. |
| 3,246,205 A | 4/1966 | Miller | 4,085,303 A | 4/1978 | McIntyre et al. |
| 3,249,134 A | 5/1966 | Vogl et al. | 4,090,345 A | 5/1978 | Harkness |
| 3,306,149 A | 2/1967 | John | 4,091,698 A | 5/1978 | Obear et al. |
| 3,313,185 A | 4/1967 | Drake et al. | 4,106,378 A | 8/1978 | Kaiser |
| 3,315,715 A | 4/1967 | Mytinger | 4,117,752 A | 10/1978 | Yoneda |
| 3,323,814 A | 6/1967 | Phillips | 4,145,940 A | 3/1979 | Woloveke et al. |
| 3,337,008 A | 8/1967 | Trachte | 4,152,833 A | 5/1979 | Phillips |
| 3,356,111 A | 12/1967 | Mitchell | 4,161,649 A | 7/1979 | Klos et al. |
| 3,386,322 A | 6/1968 | Stone et al. | 4,175,452 A | 11/1979 | Idel |
| 3,439,183 A | 4/1969 | Hurst, Jr. | 4,190,000 A | 2/1980 | Shaull et al. |
| 3,445,835 A | 5/1969 | Fudaley | 4,195,722 A | 4/1980 | Anderson et al. |
| 3,454,286 A | 7/1969 | Anderson et al. | 4,199,930 A | 4/1980 | Lebet et al. |
| 3,456,696 A | 7/1969 | Gregory et al. | 4,206,666 A | 6/1980 | Ashton |
| 3,512,440 A | 5/1970 | Frydmann | 4,249,117 A | 2/1981 | Leukhardt et al. |
| 3,538,964 A | 11/1970 | Warrick et al. | 4,249,442 A | 2/1981 | Fittery |
| 3,540,338 A | 11/1970 | McEwan et al. | 4,262,278 A | 4/1981 | Howard et al. |
| 3,554,067 A | 1/1971 | Scutella | 4,267,914 A | 5/1981 | Saar |
| 3,566,996 A | 3/1971 | Crossman | 4,270,427 A | 6/1981 | Colberg et al. |
| 3,580,376 A | 5/1971 | Loshbough | 4,276,799 A | 7/1981 | Muehling |
| 3,581,784 A | 6/1971 | Warrick | 4,291,794 A | 9/1981 | Bauer |
| 3,613,748 A | 10/1971 | De Pue | 4,305,442 A | 12/1981 | Currie |
| 3,621,894 A | 11/1971 | Niksich | 4,321,841 A | 3/1982 | Felix |
| 3,670,788 A | 6/1972 | Pollak et al. | 4,372,202 A | 2/1983 | Cameron |
| 3,675,444 A | 7/1972 | Whipple | 4,391,358 A | 7/1983 | Haeger |
| 3,680,609 A | 8/1972 | Menge | 4,418,597 A | 12/1983 | Krusemark et al. |
| 3,688,815 A | 9/1972 | Ridenour | 4,466,170 A | 8/1984 | Davis |
| 3,695,116 A | 10/1972 | Baur | 4,466,233 A | 8/1984 | Thesman |
| 3,696,844 A | 10/1972 | Bernatschek | 4,470,046 A | 9/1984 | Betsill |
| 3,719,103 A | 3/1973 | Streander | 4,510,489 A | 4/1985 | Anderson, III et al. |
| 3,745,546 A | 7/1973 | Struger et al. | 4,512,224 A | 4/1985 | Terauchi |
| 3,749,933 A | 7/1973 | Davidson | 4,518,043 A | 5/1985 | Anderson et al. |
| 3,754,493 A | 8/1973 | Niehaus et al. | 4,532,501 A | 7/1985 | Hoffman |
| 3,772,590 A | 11/1973 | Mikulecky et al. | 4,532,844 A | 8/1985 | Chang et al. |
| 3,785,230 A | 1/1974 | Lokey | 4,557,168 A | 12/1985 | Tokiwa |
| 3,793,915 A | 2/1974 | Hujer | 4,560,033 A | 12/1985 | DeWoody et al. |
| 3,805,639 A | 4/1974 | Peter | 4,566,512 A | 1/1986 | Wilson |
| 3,805,658 A | 4/1974 | Scott et al. | 4,573,556 A | 3/1986 | Andreasson |
| 3,808,932 A | 5/1974 | Russell | 4,576,073 A | 3/1986 | Stinson |
| 3,829,850 A | 8/1974 | Guetersloh | 4,589,047 A | 5/1986 | Gaus et al. |
| 3,829,970 A | 8/1974 | Anderson | 4,589,860 A | 5/1986 | Brandenstein et al. |
| 3,858,095 A | 12/1974 | Friemann et al. | 4,599,597 A | 7/1986 | Rotbart |
| 3,861,016 A | 1/1975 | Johnson et al. | 4,599,927 A | 7/1986 | Eccardt et al. |
| 3,863,208 A | 1/1975 | Balban | 4,606,251 A | 8/1986 | Boileau |
| 3,880,032 A | 4/1975 | Green | 4,615,247 A | 10/1986 | Berkeley |
| 3,882,744 A | 5/1975 | McCarroll | 4,621,300 A | 11/1986 | Summerer |
| 3,886,413 A | 5/1975 | Dow et al. | 4,625,604 A | 12/1986 | Handler et al. |
| 3,889,567 A | 6/1975 | Sato et al. | 4,637,188 A | 1/1987 | Crothers |
| 3,922,785 A * | 12/1975 | Fushiya ................. 30/391 | 4,637,289 A | 1/1987 | Ramsden |
| 3,924,688 A | 12/1975 | Cooper et al. | 4,644,832 A | 2/1987 | Smith |
| 3,931,727 A | 1/1976 | Luenser | 4,653,189 A | 3/1987 | Andreasson |
| 3,935,777 A | 2/1976 | Bassett | 4,657,428 A | 4/1987 | Wiley |
| 3,945,286 A | 3/1976 | Smith | 4,672,500 A | 6/1987 | Tholome et al. |
| 3,946,631 A | 3/1976 | Malm | 4,675,664 A | 6/1987 | Cloutier et al. |
| 3,947,734 A | 3/1976 | Fyler | 4,679,719 A | 7/1987 | Kramer |
| 3,949,636 A | 4/1976 | Ball et al. | 4,722,021 A | 1/1988 | Hornung et al. |
| 3,953,770 A | 4/1976 | Hayashi | 4,751,603 A | 6/1988 | Kwan |
| 3,960,310 A | 6/1976 | Nussbaum | 4,756,220 A | 7/1988 | Olsen et al. |
| 3,967,161 A | 6/1976 | Lichtblau | 4,757,881 A | 7/1988 | Jonsson et al. |
| 3,974,565 A | 8/1976 | Ellis | 4,774,866 A * | 10/1988 | Dehari et al. ................. 83/478 |
| 3,975,600 A | 8/1976 | Marston | 4,792,965 A | 12/1988 | Morgan |
| 3,978,624 A | 9/1976 | Merkel et al. | 4,805,504 A | 2/1989 | Fushiya et al. |
| 3,994,192 A | 11/1976 | Faig | 4,831,279 A | 5/1989 | Ingraham |

| | | | | | | |
|---|---|---|---|---|---|---|
| 4,840,135 A | | 6/1989 | Yamauchi | 5,700,165 A | | 12/1997 | Harris et al. |
| 4,845,476 A | | 7/1989 | Rangeard et al. | 5,724,875 A | * | 3/1998 | Meredith et al. ............. 83/397 |
| 4,864,455 A | | 9/1989 | Shimomura et al. | 5,730,165 A | | 3/1998 | Philipp |
| 4,875,398 A | | 10/1989 | Taylor et al. | 5,741,048 A | | 4/1998 | Eccleston |
| 4,896,607 A | | 1/1990 | Hall et al. | 5,755,148 A | | 5/1998 | Stumpf et al. |
| 4,906,962 A | | 3/1990 | Duimstra | 5,771,742 A | | 6/1998 | Bokaie et al. |
| 4,907,679 A | | 3/1990 | Menke | 5,782,001 A | | 7/1998 | Gray |
| 4,934,233 A | * | 6/1990 | Brundage et al. ............. 83/397 | 5,787,779 A | | 8/1998 | Garuglieri |
| 4,936,876 A | | 6/1990 | Reyes | 5,791,057 A | | 8/1998 | Nakamura et al. |
| 4,937,554 A | | 6/1990 | Herman | 5,791,223 A | | 8/1998 | Lanzer |
| 4,965,909 A | | 10/1990 | McCullough et al. | 5,791,224 A | | 8/1998 | Suzuki et al. |
| 4,975,798 A | | 12/1990 | Edwards et al. | 5,791,441 A | | 8/1998 | Matos et al. |
| 5,020,406 A | | 6/1991 | Sasaki et al. | 5,819,619 A | | 10/1998 | Miller et al. |
| 5,025,175 A | | 6/1991 | Dubois, III | 5,852,951 A | | 12/1998 | Santi |
| 5,042,348 A | * | 8/1991 | Brundage et al. .......... 83/471.3 | 5,861,809 A | | 1/1999 | Eckstein et al. |
| 5,046,426 A | | 9/1991 | Julien et al. | 5,875,698 A | | 3/1999 | Ceroll et al. |
| 5,052,255 A | | 10/1991 | Gaines | 5,880,954 A | | 3/1999 | Thomson et al. |
| 5,074,047 A | | 12/1991 | King | 5,921,367 A | | 7/1999 | Kashioka et al. |
| 5,081,406 A | | 1/1992 | Hughes et al. | 5,930,096 A | | 7/1999 | Kim |
| 5,082,316 A | | 1/1992 | Wardlaw | 5,937,720 A | * | 8/1999 | Itzov ........................... 83/397 |
| 5,083,973 A | | 1/1992 | Townsend | 5,942,975 A | | 8/1999 | Sorensen |
| 5,086,890 A | | 2/1992 | Turczyn et al. | 5,943,932 A | | 8/1999 | Sberveglieri |
| 5,094,000 A | | 3/1992 | Becht et al. | 5,950,514 A | | 9/1999 | Benedict et al. |
| 5,119,555 A | | 6/1992 | Johnson | 5,963,173 A | | 10/1999 | Lian et al. |
| 5,122,091 A | | 6/1992 | Townsend | 5,974,927 A | | 11/1999 | Tsune |
| 5,174,349 A | | 12/1992 | Svetlik et al. | 5,989,116 A | | 11/1999 | Johnson et al. |
| 5,184,534 A | | 2/1993 | Lee | 6,018,284 A | | 1/2000 | Rival et al. |
| 5,198,702 A | | 3/1993 | McCullough et al. | 6,037,729 A | * | 3/2000 | Woods et al. ................ 318/375 |
| 5,199,343 A | | 4/1993 | OBanion | D422,290 S | | 4/2000 | Welsh et al. |
| 5,201,684 A | | 4/1993 | DeBois, III | 6,052,884 A | | 4/2000 | Steckler et al. |
| 5,207,253 A | | 5/1993 | Hoshino et al. | 6,070,484 A | | 6/2000 | Sakamaki |
| 5,212,621 A | | 5/1993 | Panter | 6,095,092 A | | 8/2000 | Chou |
| 5,218,189 A | | 6/1993 | Hutchison | 6,119,984 A | | 9/2000 | Devine |
| 5,231,359 A | | 7/1993 | Masuda et al. | 6,131,629 A | | 10/2000 | Puzio et al. |
| 5,231,906 A | | 8/1993 | Kogej | 6,133,818 A | | 10/2000 | Shieh et al. |
| 5,239,978 A | | 8/1993 | Plangetis | 6,141,192 A | | 10/2000 | Garzon |
| 5,245,879 A | | 9/1993 | McKeon | 6,148,504 A | | 11/2000 | Schmidt et al. |
| 5,257,570 A | | 11/1993 | Shiotani et al. | 6,150,826 A | | 11/2000 | Hokodate et al. |
| 5,265,510 A | | 11/1993 | Hoyer-Ellefsen | 6,170,370 B1 | | 1/2001 | Sommerville |
| 5,272,946 A | | 12/1993 | McCullough et al. | 6,244,149 B1 | | 6/2001 | Ceroll et al. |
| 5,276,431 A | | 1/1994 | Piccoli et al. | 6,257,061 B1 | | 7/2001 | Nonoyama et al. |
| 5,285,708 A | | 2/1994 | Bosten et al. | 6,330,848 B1 | | 12/2001 | Nishio et al. |
| 5,320,382 A | | 6/1994 | Goldstein et al. | 6,336,273 B1 | | 1/2002 | Nilsson et al. |
| 5,321,230 A | | 6/1994 | Shanklin et al. | 6,352,137 B1 | | 3/2002 | Stegall et al. |
| 5,331,875 A | | 7/1994 | Mayfield | 6,366,099 B1 | | 4/2002 | Reddi |
| 5,353,670 A | * | 10/1994 | Metzger, Jr. ............... 83/471.3 | 6,376,939 B1 | | 4/2002 | Suzuki et al. |
| 5,377,554 A | | 1/1995 | Reulein et al. | 6,404,098 B1 | | 6/2002 | Kayama et al. |
| 5,377,571 A | | 1/1995 | Josephs | 6,405,624 B2 | | 6/2002 | Sutton |
| 5,392,568 A | | 2/1995 | Howard, Jr. et al. | 6,418,829 B1 | | 7/2002 | Pilchowski |
| 5,392,678 A | | 2/1995 | Sasaki et al. | 6,420,814 B1 | | 7/2002 | Bobbio |
| 5,401,928 A | | 3/1995 | Kelley | 6,427,570 B1 | | 8/2002 | Miller et al. |
| 5,411,221 A | | 5/1995 | Collins et al. | 6,430,007 B1 | | 8/2002 | Jabbari |
| 5,423,232 A | | 6/1995 | Miller et al. | 6,431,425 B1 | | 8/2002 | Moorman et al. |
| 5,436,613 A | | 7/1995 | Ghosh et al. | 6,450,077 B1 | | 9/2002 | Ceroll et al. |
| 5,451,750 A | | 9/1995 | An | 6,453,786 B1 | | 9/2002 | Ceroll et al. |
| 5,453,903 A | | 9/1995 | Chow | 6,460,442 B2 | | 10/2002 | Talesky et al. |
| 5,471,888 A | | 12/1995 | McCormick | 6,471,106 B1 | | 10/2002 | Reining |
| 5,480,009 A | | 1/1996 | Wieland et al. | 6,479,958 B1 | | 11/2002 | Thompson et al. |
| 5,503,059 A | | 4/1996 | Pacholok | D466,913 S | | 12/2002 | Ceroll et al. |
| 5,510,685 A | | 4/1996 | Grasselli | 6,492,802 B1 | | 12/2002 | Bielski |
| 5,513,548 A | | 5/1996 | Garuglieri | D469,354 S | | 1/2003 | Curtsinger |
| 5,531,147 A | * | 7/1996 | Serban ........................ 83/478 | 6,502,493 B1 | | 1/2003 | Eccardt et al. |
| 5,534,836 A | | 7/1996 | Schenkel et al. | 6,536,536 B1 | | 3/2003 | Gass et al. |
| 5,572,916 A | | 11/1996 | Takano | 6,543,324 B2 | | 4/2003 | Dils |
| 5,587,618 A | | 12/1996 | Hathaway | 6,546,835 B2 | | 4/2003 | Wang |
| 5,592,353 A | | 1/1997 | Shinohara et al. | 6,575,067 B2 | | 6/2003 | Parks et al. |
| 5,606,889 A | | 3/1997 | Bielinski et al. | 6,578,460 B2 | | 6/2003 | Sartori |
| 5,623,860 A | | 4/1997 | Schoene et al. | 6,578,856 B2 | | 6/2003 | Kahle |
| 5,648,644 A | | 7/1997 | Nagel | 6,595,096 B2 | | 7/2003 | Ceroll et al. |
| 5,659,454 A | | 8/1997 | Vermesse | D478,917 S | | 8/2003 | Ceroll et al. |
| 5,667,152 A | * | 9/1997 | Mooring ................... 241/37.5 | 6,601,493 B1 | | 8/2003 | Crofutt |
| 5,671,633 A | | 9/1997 | Wagner | 6,607,015 B1 | | 8/2003 | Chen |
| 5,695,306 A | | 12/1997 | Nygren, Jr. | D479,538 S | | 9/2003 | Welsh et al. |

| | | |
|---|---|---|
| 6,617,720 B1 | 9/2003 | Egan, III et al. |
| 6,619,348 B2 | 9/2003 | Wang |
| 6,640,683 B2 | 11/2003 | Lee |
| 6,644,157 B2 | 11/2003 | Huang |
| 6,647,847 B2 | 11/2003 | Hewitt et al. |
| 6,659,233 B2 | 12/2003 | DeVlieg |
| 6,734,581 B1 | 5/2004 | Griffis |
| 6,736,042 B2 | 5/2004 | Behne et al. |
| 6,742,430 B2 | 6/2004 | Chen |
| 6,796,208 B1 | 9/2004 | Jorgensen |
| 6,826,988 B2 | 12/2004 | Gass et al. |
| 6,857,345 B2 | 2/2005 | Gass et al. |
| 6,874,397 B2 | 4/2005 | Chang |
| 6,874,399 B2 | 4/2005 | Lee |
| 6,877,410 B2 | 4/2005 | Gass et al. |
| 6,880,440 B2 | 4/2005 | Gass et al. |
| 6,883,397 B2 | 4/2005 | Kimizuka |
| 6,889,585 B1 | 5/2005 | Harris et al. |
| 6,920,814 B2 | 7/2005 | Gass et al. |
| 6,945,148 B2 | 9/2005 | Gass et al. |
| 6,945,149 B2 | 9/2005 | Gass et al. |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017183 A1 | 2/2002 | Gass et al. |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0056348 A1 | 5/2002 | Gass et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0069734 A1 | 6/2002 | Gass et al. |
| 2002/0096030 A1 | 7/2002 | Wang |
| 2002/0109036 A1 | 8/2002 | Denen et al. |
| 2002/0170399 A1 | 11/2002 | Gass et al. |
| 2002/0170400 A1 | 11/2002 | Gass |
| 2002/0190581 A1 | 12/2002 | Gass et al. |
| 2003/0002942 A1 | 1/2003 | Gass et al. |
| 2003/0005588 A1 | 1/2003 | Gass et al. |
| 2003/0015253 A1 | 1/2003 | Gass et al. |
| 2003/0019341 A1 | 1/2003 | Gass et al. |
| 2003/0020336 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0058121 A1 | 3/2003 | Gass et al. |
| 2003/0074873 A1 | 4/2003 | Freiberg et al. |
| 2003/0089212 A1 | 5/2003 | Parks et al. |
| 2003/0090224 A1 | 5/2003 | Gass et al. |
| 2003/0101857 A1 | 6/2003 | Chuang |
| 2003/0109798 A1 | 6/2003 | Kermani |
| 2003/0131703 A1 | 7/2003 | Gass et al. |
| 2003/0140749 A1 | 7/2003 | Gass et al. |
| 2004/0011177 A1 | 1/2004 | Huang |
| 2004/0040426 A1 | 3/2004 | Gass et al. |
| 2004/0060404 A1 | 4/2004 | Metzger, Jr. |
| 2004/0104085 A1 | 6/2004 | Lang et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2005/0057206 A1 | 3/2005 | Uneyama |
| 2005/0066784 A1 | 3/2005 | Gass |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0155473 A1 | 7/2005 | Gass |
| 2005/0166736 A1 | 8/2005 | Gass et al. |
| 2005/0204885 A1 | 9/2005 | Gass et al. |
| 2005/0274432 A1 | 12/2005 | Gass et al. |

OTHER PUBLICATIONS

Shop Fox® Fence Operating Manual, Woodstock International, Inc., 1996, revised May 1997.
Analog Devices, Inc., 3-Axis Capacitive Sensor—Preliminary Technical Data AD7103, 1998.
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Company, Sep. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Shop Fox® Models, W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commerical Fence System Instruction Manual, Delta Machinery, May 2, 2005.
Laguna Tools table saw owner's manual, date unknown.

* cited by examiner

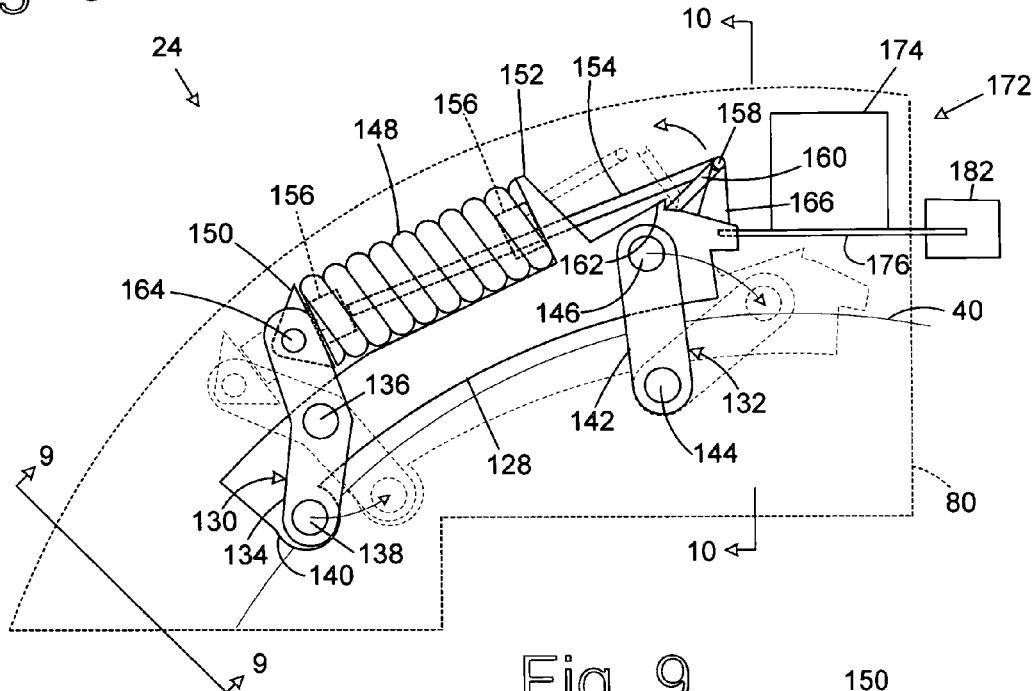
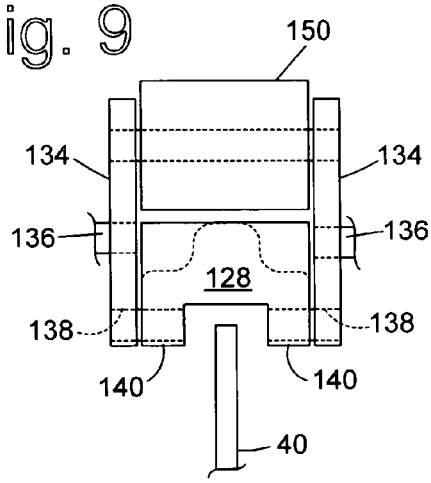
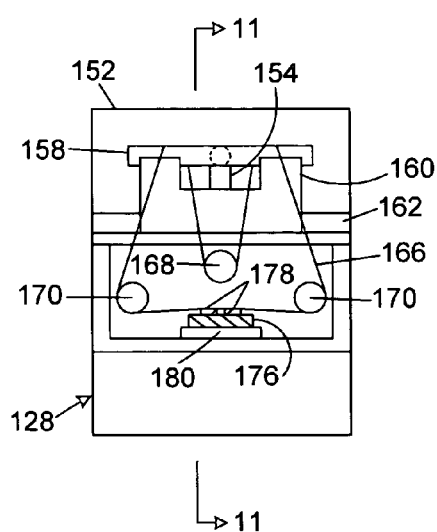
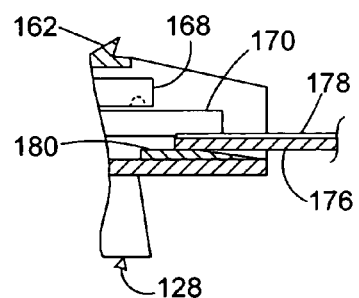

MITER SAW WITH IMPROVED SAFETY SYSTEM

CROSS-REFERENCE TO RELATED APPLICATIONS

This application is a continuation of the following U.S. patent applications, the complete disclosures of which are all hereby incorporated by reference for all purposes: Ser. No. 09/929,238, filed Aug. 13, 2001, Ser. No. 10/047,066, filed Jan. 14, 2002 now U.S. Pat. No. 6,945,148, Ser. No. 10/051,782, filed Jan. 15, 2002 now U.S. Pat. No. 6,877,410, Ser. No. 10/052,806, filed Jan. 16, 2002 now U.S. Pat. No. 6,880,440, Ser. No. 10/643,296, filed Aug. 18, 2003, and Ser. No. 10/932,339, filed Sep. 1, 2004.

FIELD OF THE DISCLOSURE

The present disclosure relates to miter saws, and more particularly to a miter saw with a high-speed safety system.

BACKGROUND OF THE DISCLOSURE

Miter saws are a type of woodworking machinery used to cut workpieces of wood, plastic and other materials. Miter saws typically include a base upon which workpieces are placed and include a circular saw blade mounted on a pivot arm. A person uses a miter saw by placing a workpiece on the base beneath the upraised blade and then bringing the blade down via the pivot arm to cut the workpiece. Miter saws present a risk of injury to users because the spinning blade is often exposed when in use. Furthermore, users often use their hands to position and support workpieces beneath the blade, which increases the chance that an injury will occur.

The present disclosure provides a miter saw with an improved safety system that is adapted to detect the occurrence of one or more dangerous, or triggering, conditions during use of the miter saw, such as when a user's body contacts the spinning saw blade. When such a condition occurs, the safety system is actuated to limit or even prevent injury to the user.

BRIEF DESCRIPTION OF THE DRAWINGS

FIG. 8 is a magnified, detailed schematic view of the exemplary reaction subsystem of FIG. 6.

FIG. 9 is a schematic view taken generally along line 9-9 in FIG. 8.

FIG. 10 is a schematic view taken generally along line 10-10 in FIG. 8.

FIG. 11 is a schematic view taken generally along line 11-11 in FIG. 10.

DETAILED DESCRIPTION AND BEST MODE OF THE DISCLOSURE

Figure 1:
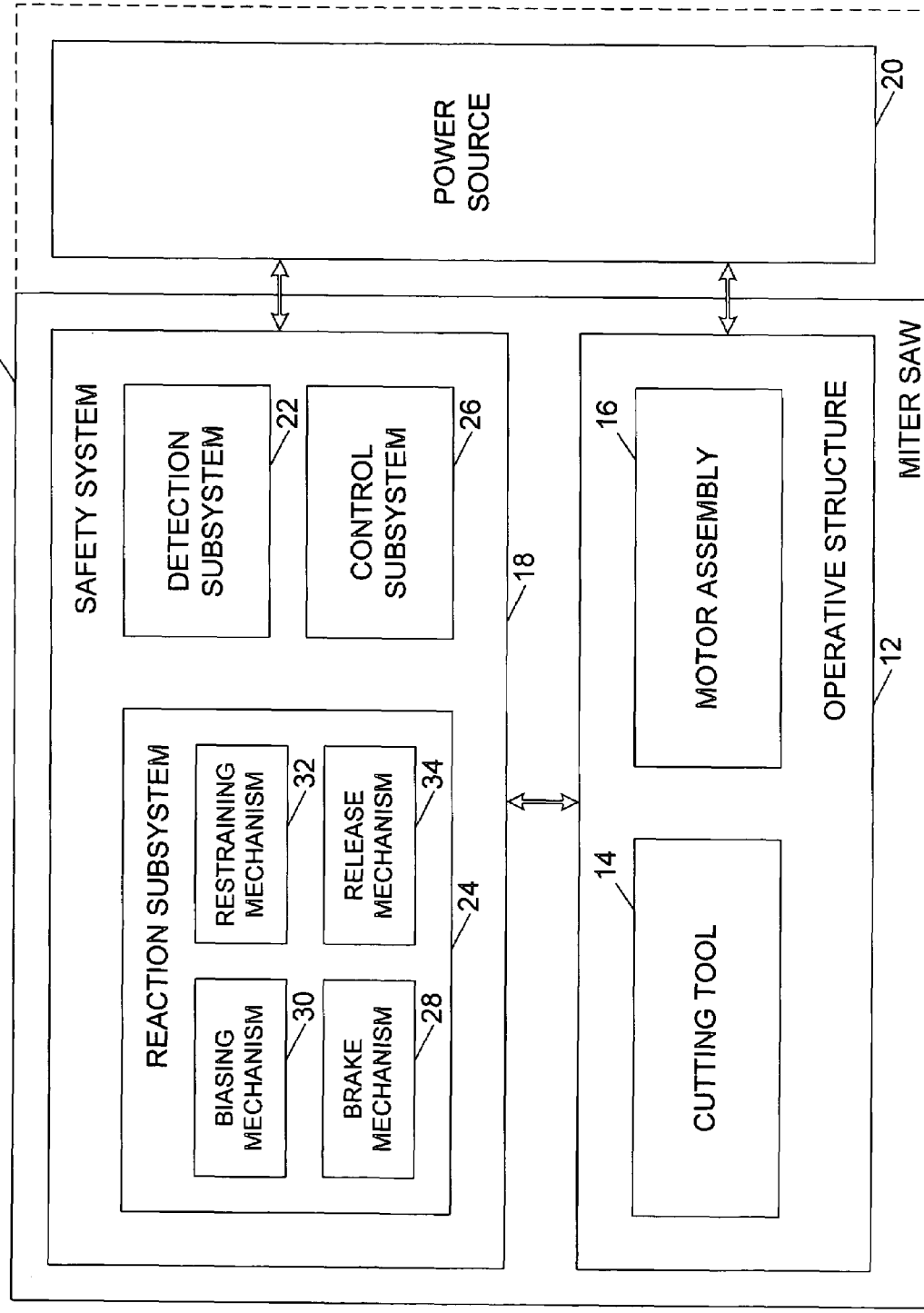
FIG. 1 is a schematic block diagram of a miter saw with a fast-acting safety system according to the present invention.

A miter saw according to the present disclosure is shown schematically in FIG. 1 and indicated generally at 10. Miter saw 10 may be any of a variety of different types and configurations of miter saw adapted for cutting workpieces, such as wood, plastic, etc. Miter saw 10 includes an operative structure 12 having a cutting tool 14 and a motor assembly 16 adapted to drive the cutting tool. Miter saw 10 also includes a safety system 18 configured to minimize the potential of a serious injury to a person using miter saw 10. Safety system 18 is adapted to detect the occurrence of one or more dangerous, or triggering, conditions during use of miter saw 10. If such a dangerous condition is detected, safety system 18 is adapted to engage operative structure 12 to limit any injury to the user caused by the dangerous condition.

Miter saw 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of miter saw 10.

It will be appreciated that operative structure 12 may take any one of many different forms, depending on the type of miter saw 10. As will be described in more detail below, operative structure 12 typically takes the form of an arm pivotally coupled to a base. Cutting tool 14 is mounted on the arm and pivotal toward a workpiece supported by the base. Alternatively, the arm may be both pivotally and slidably coupled to the base.

Motor assembly 16 includes one or more motors adapted to drive cutting tool 14. The motors may be either directly or indirectly coupled to the cutting tool. Typically, motor assembly 16 is mounted on the pivot arm and directly coupled to the cutting tool.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of miter saw 10. In addition, control subsystem 26 typically includes one or more instruments operable by a user to control the miter saw. The control subsystem is configured to control miter saw 10 in response to the inputs it receives.

Detection subsystem 22 is configured to detect one or more dangerous, or triggering, conditions during use of miter saw 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000 and U.S. patent application Ser. No. 09/676,190, filed Sep. 29, 2000, the disclosures of which are herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of miter saw 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000 and U.S. patent application Ser. No. 09/929,226, filed Aug. 13, 2001, the disclosures of which are herein incorporated by reference. Retraction of the cutting tool from its operating position is described in more detail in U.S. Provisional Patent Application Ser. No. 60/225,089, filed Aug. 14, 2000 and U.S. patent application Ser. No. 09/929,242, filed Aug. 13, 2001, the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of miter saw 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
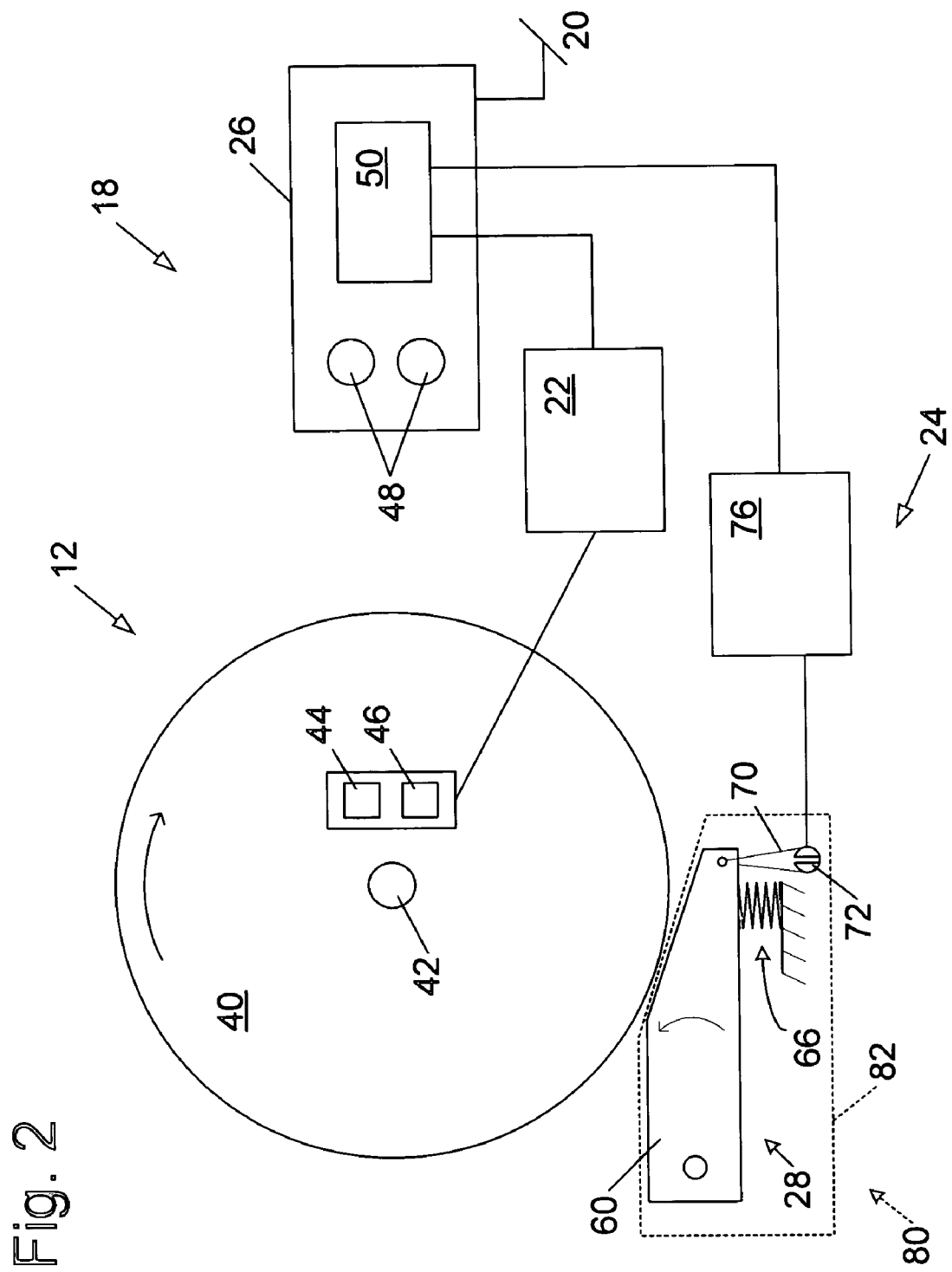
FIG. 2 is a schematic diagram of an exemplary safety system configured to stop the miter saw blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of miter saw 10 includes a cutting tool 14 in the form of a circular blade 40 mounted on a rotating shaft or arbor 42. Blade 40 includes a plurality of cutting teeth (not shown) disposed around the outer edge of the blade. As described in more detail below, brake mechanism 28 is adapted to engage the teeth of blade 40 and stop rotation of the blade.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14, is electrically isolated from the remainder of miter saw 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, U.S. patent application Ser. No. 09/929,426, filed Aug. 13, 2001, U.S. Provisional Patent Application Ser. No. 60/225,211, filed Aug. 14, 2000, U.S. patent application Ser. No. 09/929,221, filed Aug. 13, 2001 and U.S. Provisional Patent Application Ser. No. 60/270,011, filed Feb. 20, 2001, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, U.S. patent application Ser. No. 09/929,237, filed Aug. 13, 2001, U.S. Provisional Patent Application Ser. No. 60/225,094, filed Aug. 14, 2000 and U.S. patent application Ser. No. 09/929,234, filed Aug. 13, 2001, the disclosures of which are herein incorporated by reference.

In the exemplary implementation shown in FIG. 2, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW), Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism such as a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism such as a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately ½32-inch to ¼-inch from the edge of the blade by fusible member 70; however other pawl-to-blade spacings may also be used within the scope of the disclosure.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, U.S. patent application Ser. No. 09/929,240, filed Aug. 13, 2001, U.S. Provisional Patent Application Ser. No. 60/225,169, filed Aug. 14, 2000, U.S. patent application Ser. No. 09/929,241, filed Aug. 13, 2001, U.S. Provisional Patent Application Ser. No. 60/225,170, filed Aug. 14, 2000 and U.S. patent application Ser. No. 09/929,227, filed Aug. 13, 2001, the disclosures of which are herein incorporated by reference.

It will be appreciated that activation of the brake mechanism may require the replacement of one or more portions of safety system 18. For example, pawl 60 and fusible member 70 typically are single-use components which must be replaced before the safety system is ready to be used again. Thus, it may be desirable to incorporate one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, U.S. patent application Ser. No. 09/929,236, filed Aug. 13, 2001, U.S. Provisional Patent Application Ser. No. 60/225,212, filed Aug. 14, 2000 and U.S. patent application Ser. No. 09/929,244, filed Aug. 13, 2001, the disclosures of which are herein incorporated by reference.

In the exemplary embodiment illustrated in FIG. 2, reaction subsystem 24 is configured to act on cutting tool 14 and stop rotation of blade 40. As mentioned above, reaction subsystem 24 may be configured also to act on a different portion of operative structure 12 to stop and/or reverse the translation of blade 40 toward the workpiece and the user's body. Otherwise, the blade may continue to move toward the user's body even though the blade has stopped rotating. For example, U.S. Provisional Patent Application Ser. No. 60/270,941, filed Feb. 22, 2001, U.S. Provisional Patent Application Ser. No. 60/270,942, filed Feb. 22, 2001, U.S. Provisional Patent Application Ser. No. 60/273,178, filed Mar. 2, 2001, U.S. Provisional Patent Application Ser. No. 60/273,902, filed Mar. 6, 2001, U.S. Provisional Patent Application Ser. No. 60/275,594, filed Mar. 13, 2001, and U.S. Provisional Patent Application Ser. No. 60/275,595, filed Mar. 13, 2001, the disclosures of which are herein incorporated by reference, describe various alternative embodiments of reaction subsystem 24 configured to stop any downward movement of the miter saw blade and/or move the blade upward away from the workpiece and the user's body.

Figure 3:
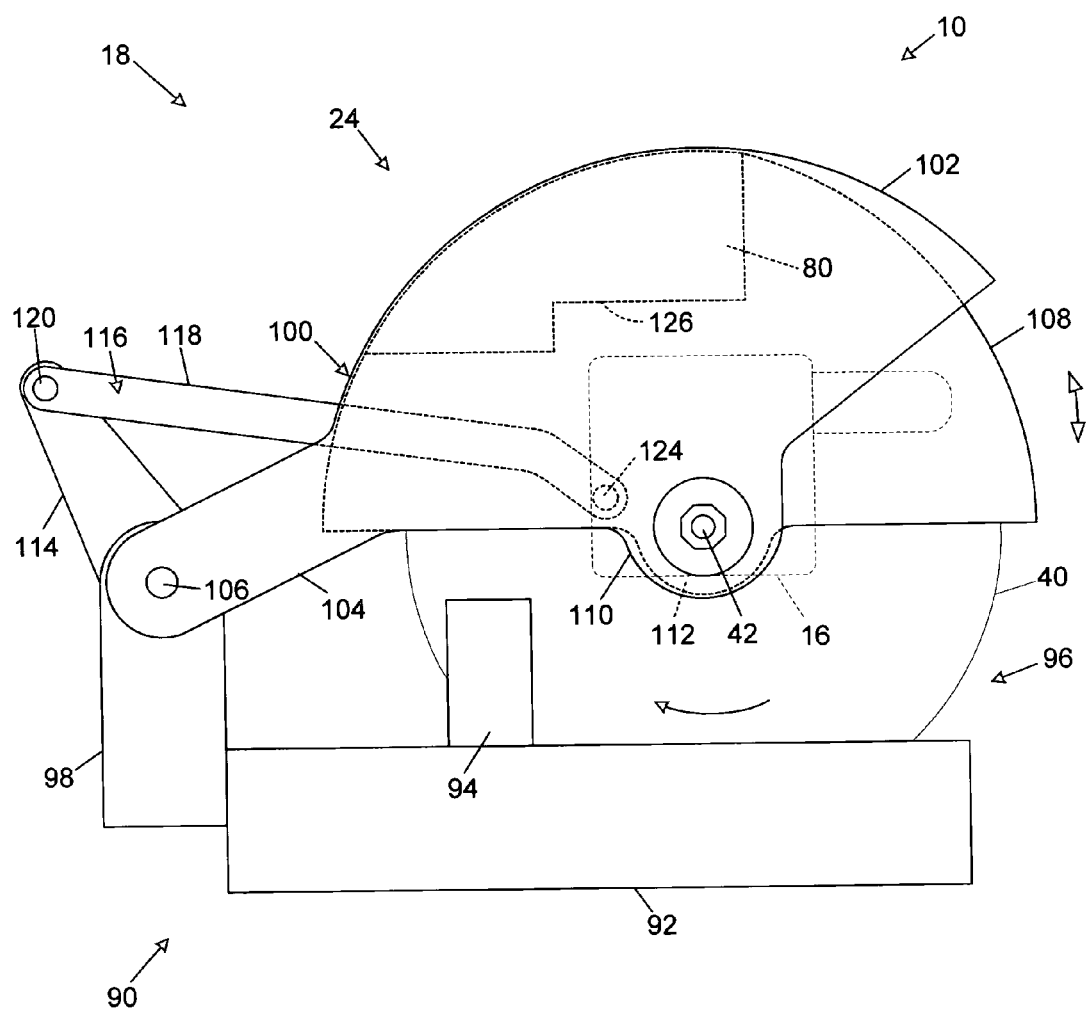
FIG. 3 is a schematic side elevation of an exemplary miter saw having a safety system configured to stop both the rotation and downward movement of the blade.
Figure 4:
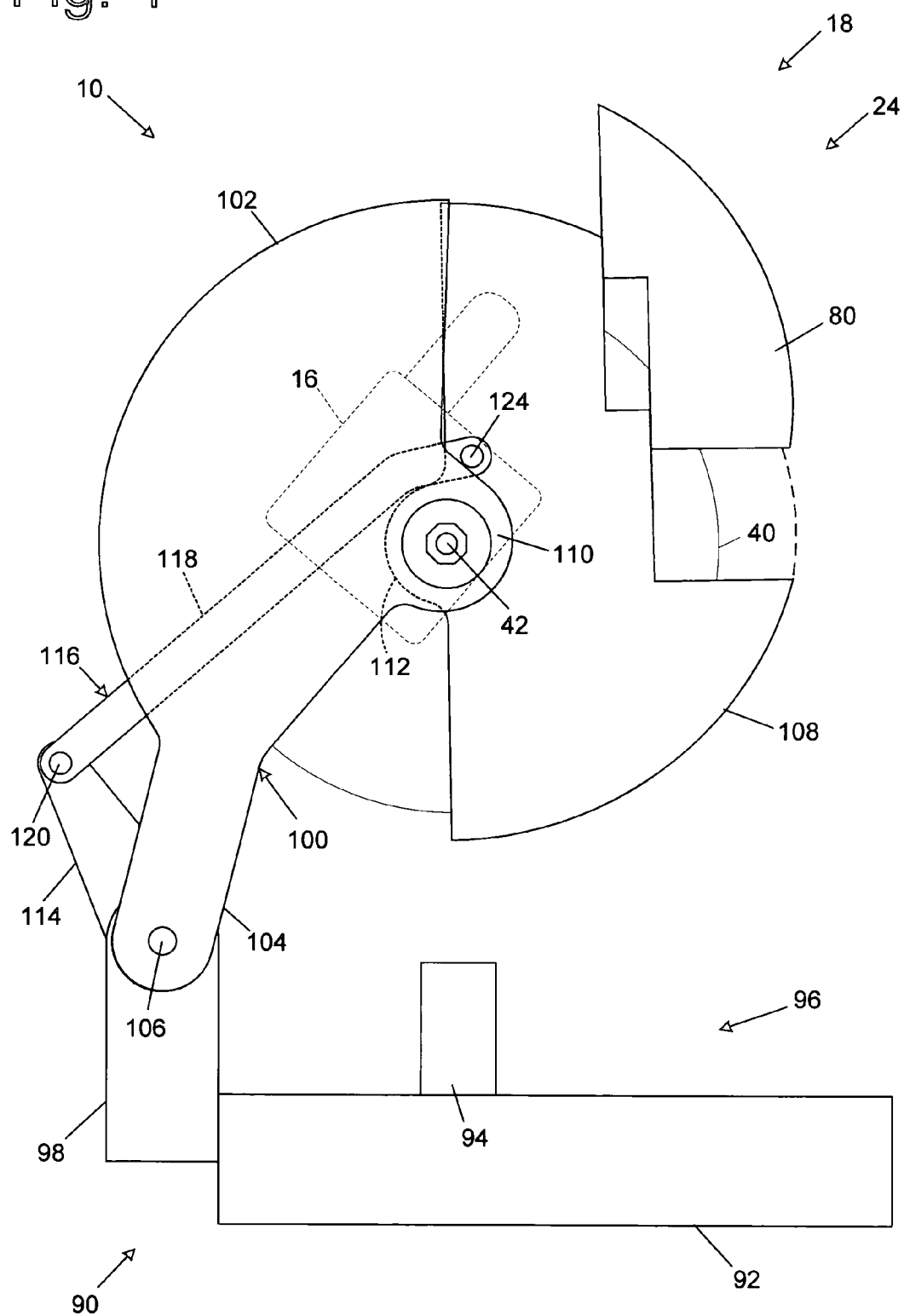
FIG. 4 is similar to FIG. 3 but shows the pivot arm assembly pivoted upward away from the cutting zone.
Figure 5:
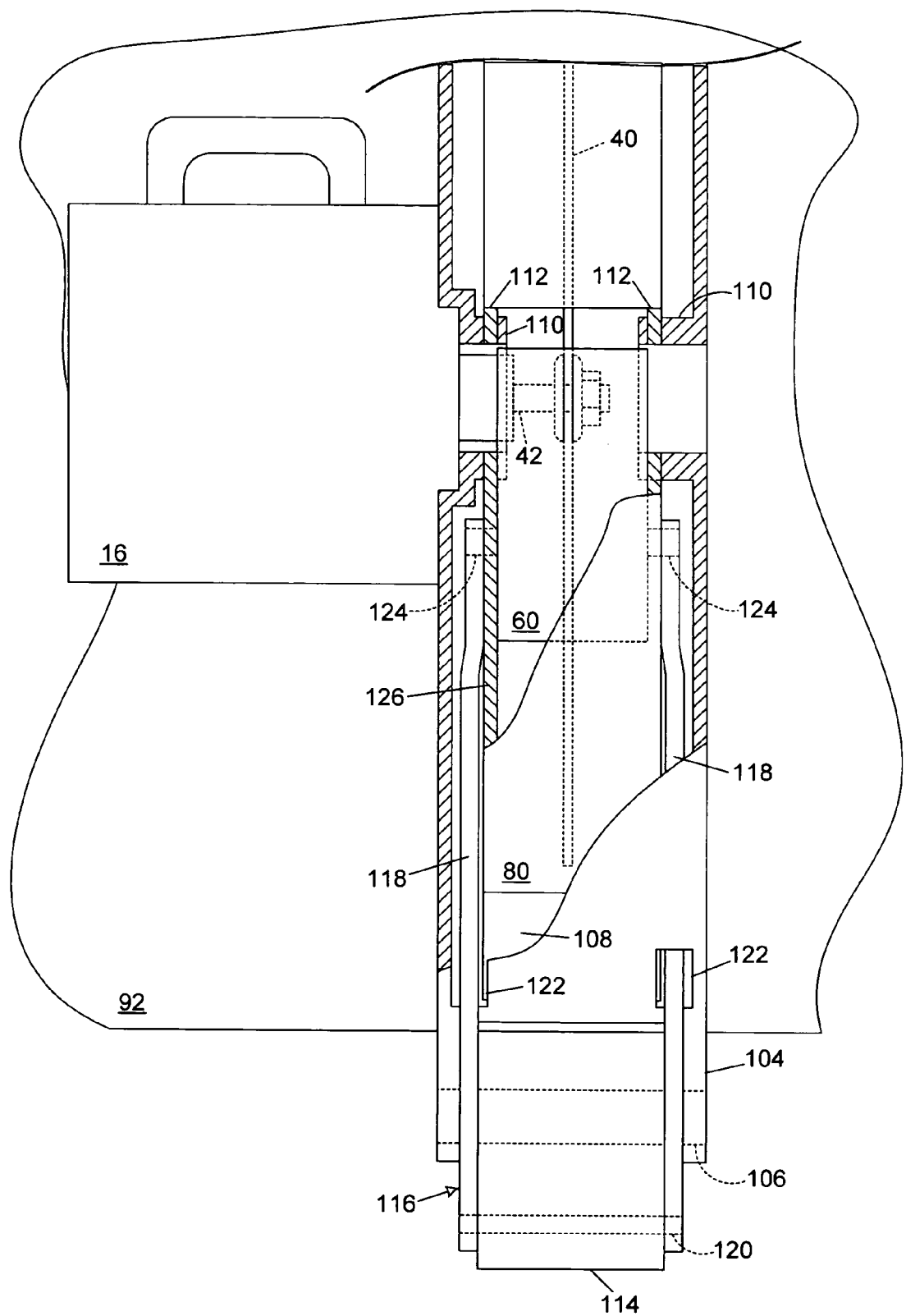
FIG. 5 is a fragmentary, top plan schematic view of the miter saw of FIG. 3 with portions of the exterior and interior housing cut away to show the brake pawl and the coupling between the exterior and interior housings.
Figure 6:
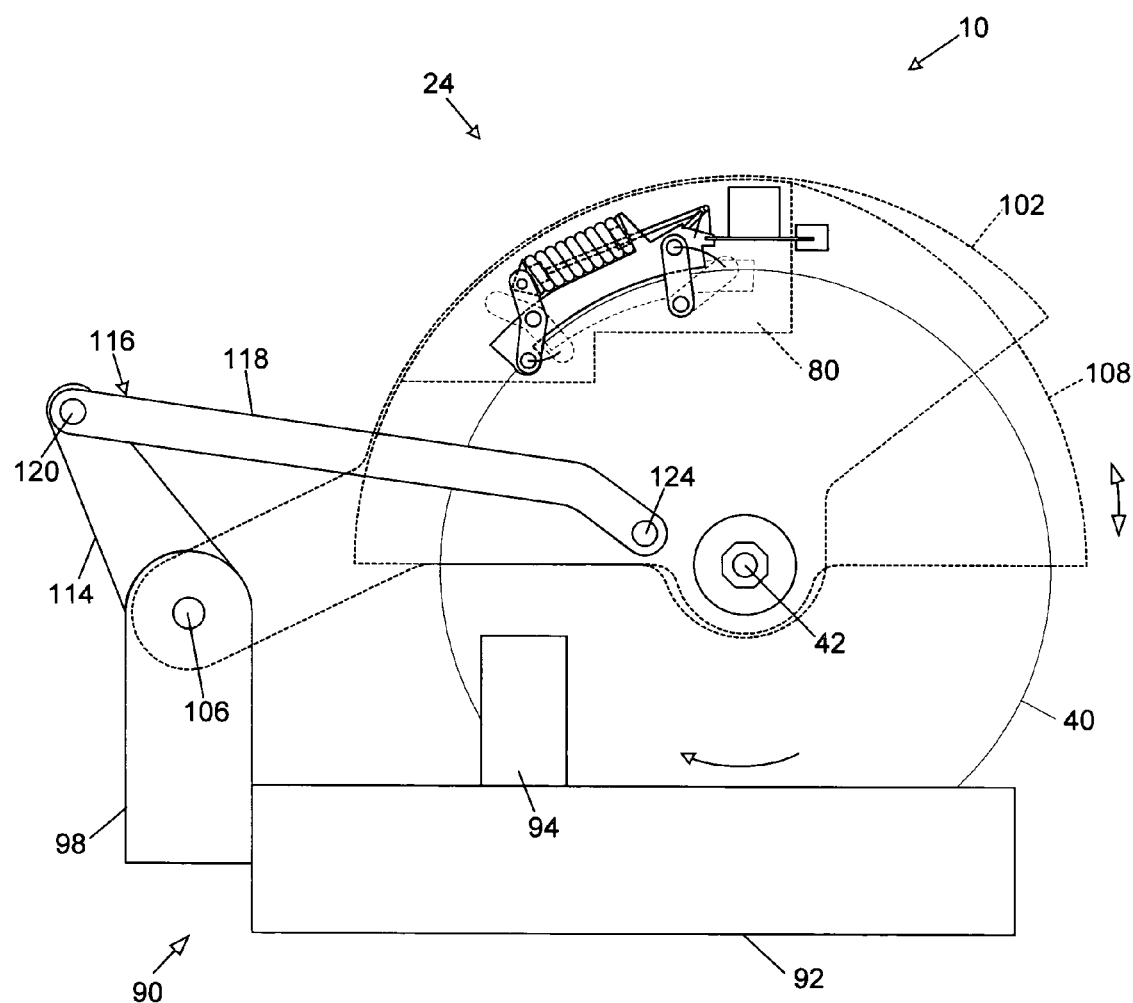
FIG. 6 is a schematic side elevation of another exemplary miter saw having an alternative safety system configured to stop both the rotation and downward movement of the blade.
Figure 7:
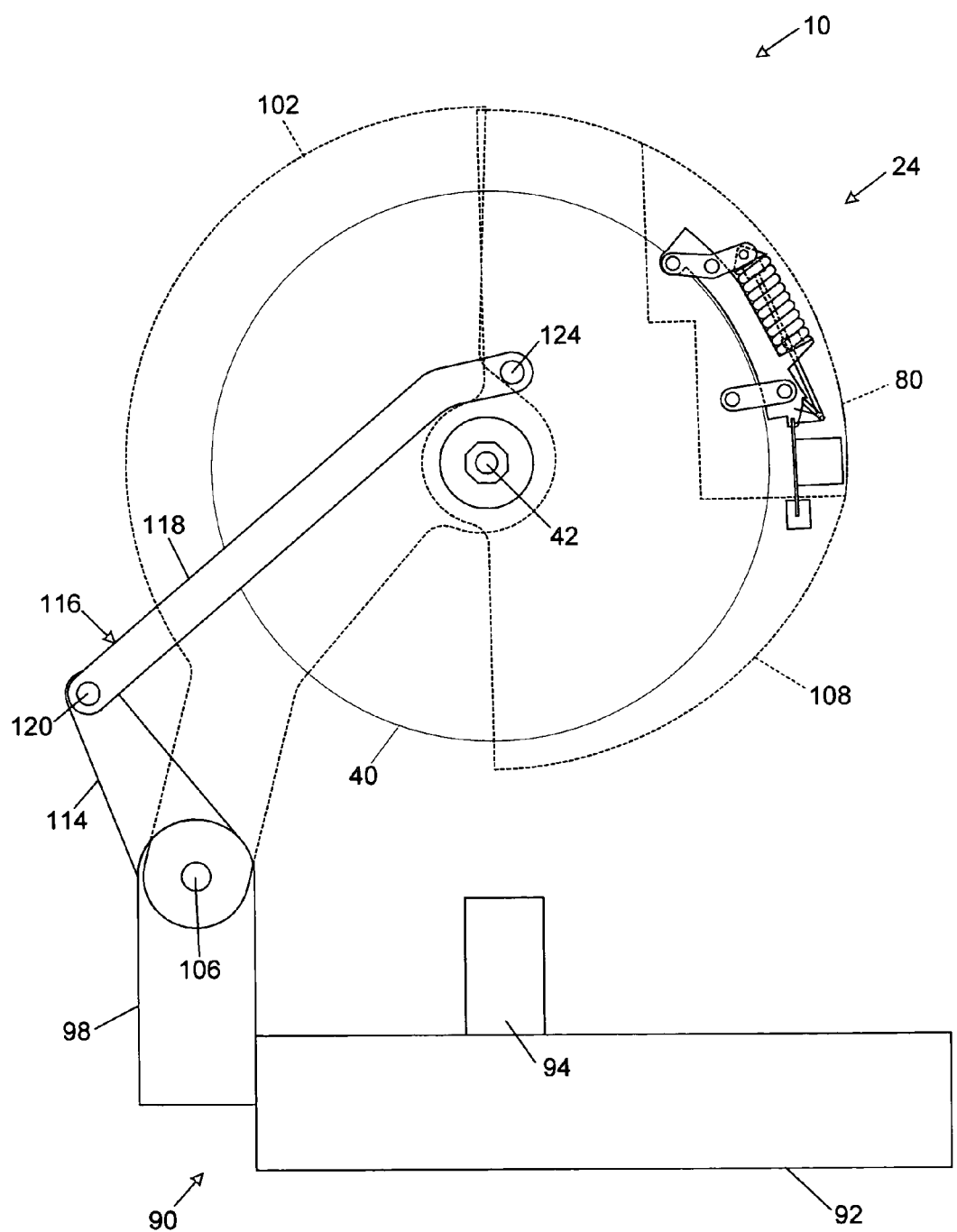
FIG. 7 is similar to FIG. 6 but shows the pivot arm assembly pivoted upward away from the cutting zone.

Turning attention now to FIGS. 3-5, another alternative embodiment is illustrated in which reaction subsystem 24 is configured to stop both the rotation and downward movement of the blade. Exemplary miter saw 10 includes a base assembly 90 having a base 92 adapted to support a workpiece during cutting. Typically, one or more fences 94 are mounted on base 92 and adapted to prevent workpieces from shifting across the base during cutting. Base 92 and fences 94 define a cutting zone 96 in which workpieces may be cut. Exemplary base assembly 90 also includes a tilt mechanism 98 coupled to base 92.

As in the embodiments described above, blade 40 is mounted on a rotatable arbor 42. The arbor is driven by a motor assembly 16 which is supported above base 92 by a pivot arm assembly 100. As shown in FIGS. 3 and 4, the pivot arm assembly is selectively pivotal toward and away from cutting zone 96 to cut workpieces with the blade. In addition, at least a portion of tilt mechanism 98 is selectively tiltable relative to base 92 to make beveled cuts in the workpiece.

Pivot arm assembly 100 includes an exterior housing 102 extending outward from one end of an arm 104. The opposite end of arm 104 is connected to tilt mechanism 98 by a pivot coupling 106. Exterior housing 102 is configured to extend at least partially around an upper portion of blade 40. Typically, pivot arm assembly 100 includes a spring or other biasing mechanism (not shown) adapted to maintain the exterior housing and blade in a fully upward position away from cutting zone 96 when the miter saw is not in use. The exterior housing may be constructed of metal, plastic or any other suitable material.

Pivot arm assembly 100 also includes an interior housing 108 pivotally coupled to exterior housing 102, and configured to extend over a portion of blade 40. Interior housing 108 is configured to be received at least partially within exterior housing 102 between the blade and exterior housing. In the exemplary embodiment, the interior housing is configured as a generally semi-circular shell coupled to pivot about the central elongate axis of arbor 42. Alternatively, the interior housing may take any other suitable shape. Interior housing 108 may be constructed of any suitable material including metal, plastic, etc.

As can be seen by comparing FIGS. 3 and 4, interior housing 108 is counter-pivotally coupled to pivot arm assembly 100. As the pivot arm assembly is pivoted in a clockwise direction (as viewed in FIGS. 3 and 4) about pivot coupling 106, the interior housing pivots in a counter-clockwise direction about the arbor. Conversely, when the pivot arm assembly is pivoted in a counter-clockwise direction (as viewed in FIGS. 3 and 4) about pivot coupling 106, the interior housing pivots in a clockwise direction about the arbor. It will be appreciated by those of skill in the art that the interior housing also functions as a blade guard by covering at least some of that portion of the blade that extends from exterior housing 102. When the pivot arm assembly is pivoted away from the cutting zone, a major portion of the interior housing is pivoted out of the exterior housing to cover the blade. However, when the pivot arm assembly is pivoted toward the cutting zone, the interior housing retracts at least partially inside the exterior housing to expose more of the blade with which to cut the workpiece.

Interior housing 108 can be counter-pivotally coupled to pivot arm assembly 100 by any of a variety of different mechanisms. In the exemplary embodiment depicted in FIGS. 3-5, the interior surface of exterior housing 102 includes a pair of inwardly projecting support rings 110 symmetrical about arbor 42. Interior housing 108 includes a pair of collar structures 112 adapted to fit over and pivot around support rings 110. Optionally, clips or similar mechanisms (not shown) may be installed to retain collar structures 112 on support rings 110.

Interior housing 108 is coupled to a brace member 114 by a linkage assembly 116. Brace member 114 extends upward from tilt mechanism 98. In the exemplary embodiment, brace member 114 extends upward from the tilt mechanism at an angle away from pivot arm assembly 100 so that the pivot arm assembly is not obstructed from pivoting to a fully raised position, as illustrated in FIG. 4. It will be appreciated that brace member 114 and tilt mechanism 98 may be formed as an integral, unitary structure. Alternatively, the brace member and tilt mechanism may be formed separately and then coupled together. In any event, the brace member is coupled to the tilt mechanism so as to prevent any pivoting movement of the brace member toward or away from the cutting zone. However, the brace member is configured to tilt along with the tilt mechanism relative to the base when the miter saw is adjusted for bevel cuts.

In the exemplary embodiment, linkage assembly 116 includes a pair of link arms 118. One end of each link arm is pivotally coupled to either side of brace member 116 by a pivot coupling 120. Link arms 118 extend forward from the brace member and into exterior housing 102 through one or more holes 122 in the exterior housing. The opposite ends of the link arms are pivotally coupled to either side of interior housing 108 by a pair of pivot couplings 124. While linkage assembly 116 has been described as a pair of separate link arms, it will be appreciated that the linkage assembly may alternatively be configured in a variety of other ways. For example, the linkage assembly may be formed as a unitary member with spaced-apart arms, etc. As another example, the linkage assembly may be coupled to only a single side of interior housing 108. In any event, linkage assembly 116 pulls or pushes interior housing 108 around the blade as pivot arm assembly 100 is pivoted toward or away from cutting zone 96. Thus, as the pivot arm assembly pivots about pivot coupling 106, the interior housing pivots in an opposite direction around the arbor.

Interior housing 108 includes a recessed region 126 adapted to receive a cartridge 80. Typically, the exterior surface of cartridge 80 is configured to conform to the shape of the interior housing. In other words, the cartridge forms a portion of the interior housing. Alternatively, cartridge 80 may be receivable within a removable portion of the interior housing that is adapted to engage recessed region 126. In any event, cartridge 80 includes one or more components of reaction subsystem 24. Typically, cartridge 80 includes a brake mechanism, a biasing mechanism, a restraining mechanism and a release mechanism such as described above. The restraining mechanism is adapted to hold the brake mechanism out of engagement with the blade against the urging of the biasing mechanism. The release mechanism is configured to selectively release the brake mechanism from the restraining mechanism to engage the blade, usually stopping the blade within approximately 2-5 milliseconds. In the exemplary embodiment depicted in FIG. 5 the brake mechanism includes a spring-biased brake pawl 60. An alternative example of a suitable reaction subsystem is described in more detail below. Additional alternative reaction subsystems, including restraining mechanisms, biasing mechanisms, release mechanisms, cartridges and brake pawls, are described in more detail above and in the incorporated references.

Because interior housing 108 is configured to pivot about the central elongate axis of the arbor, cartridge 80 and brake pawl 60 are maintained at a constant radial distance from arbor 42. The cartridge and brake pawl are also maintained in a constant orientation relative to the arbor and the perimeter of the blade. Thus, the brake pawl may be positioned relatively close to the edge of the blade to minimize the time required to move the brake pawl into the teeth of the blade.

In response to an activation signal from a control subsystem (not shown), brake pawl 60 is pivoted into the teeth of blade 40. When the brake pawl engages the blade the angular momentum of the blade produces a force on the brake pawl that tends to urge the brake pawl to move in a clockwise direction around the arbor. As a result, cartridge 80 and interior housing 108 are urged in a clockwise direction around the arbor. In other words, at least a portion of the angular momentum of the blade is transferred to the brake pawl, cartridge and interior housing. The force on the interior housing is transferred to brace member 114 by linkage assembly 116. The linkage assembly may be constructed of any relatively rigid material adapted to support the brake pawl and interior housing during braking of the blade, including metal, plastic, etc.

Brace member 114 and linkage assembly 116 prevent the interior housing from moving clockwise around the blade unless pivot arm assembly 100 pivots upward away from the cutting zone. As a result, pivot arm assembly 100 will be urged upward by engagement of the brake pawl with the blade. The amount of upward force on the pivot arm assembly will depend, at least partially, on the height of pivot coupling 120 above pivot coupling 106, relative to the position of pivot couplings 124. As the height of pivot coupling 120 above pivot coupling 106 is increased, the upward force on the blade during braking will likewise increase. Typically, the height of pivot coupling 120 above pivot coupling 106 is selected so that the upward force on the pivot arm assembly during braking is sufficient to stop any downward motion of the pivot arm assembly under normal operating conditions (i.e., the pivot arm assembly is pivoted downward toward the cutting zone at a normal speed and with a normal amount of force). Optionally, the height of pivot coupling 120 above pivot coupling 106 is selected so that the upward force on the pivot arm assembly during braking is sufficient to overcome and reverse any normal downward momentum of the pivot arm assembly, thereby retracting the blade upward away from cutting zone 96.

As described above, brake pawl 60 is arranged and supported to convert at least a portion of the kinetic energy of the rotating blade into an upward force on the pivot arm assembly. Thus, exemplary brake mechanism 28 is configured to stop both the rotation of the blade and any downward movement of the blade using a single brake pawl. As a result, only a single cartridge or brake pawl need be replaced after the brake mechanism has been triggered. Since the upward force on the blade and housing is produced by the rapid deceleration of the blade by the brake pawl, the upward force is only temporary. Once the rotation of the blade has stopped, the housing is free to pivot toward or away from the cutting zone. Nevertheless, the blade will remain locked against further rotation until the cartridge is removed.

In the exemplary embodiment, cartridge 80 is releasably coupled to interior housing 108 by a tongue-and-groove coupling. Thus, the cartridge is replaced by sliding the used cartridge off the interior housing as illustrated in FIG. 4, and then sliding a new cartridge into place. The cartridge and interior housing are configured so that, once the cartridge is in place, additional clockwise force (as viewed in FIGS. 3 and 4) on the cartridge is transferred directly to the interior housing. Typically, the cartridge and/or the interior housing include suitable structure (e.g., detents, snap-fit clips, etc.) configured to hold the cartridge in place during use. It will be appreciated that while one type of releasable coupling between the cartridge and interior housing has been described, the coupling between the cartridge and interior housing may alternatively take any of a variety of different forms such as are known to those of skill in the art including bolts, latches, etc.

As mentioned above, reaction subsystem 24 may be configured in any of a variety of different ways. Examples of suitable reaction subsystems have been described above and in the incorporated references. In addition, FIGS. 6-11 illustrate another alternative configuration of reaction subsystem 24 adapted to stop rotation of the blade. The exemplary reaction subsystem includes a brake pawl 128 coupled to the cartridge by a first pivotal coupling assembly 130 and a second pivotal coupling assembly 132. First pivotal coupling assembly 130 includes a pair of pivot arms 134, one disposed on either side of brake pawl 128. A central portion of each pivot arm 134 is coupled to opposite sides of the cartridge by pivot pins 136 so that the pivot arm pivots about pins 136 relative to the cartridge. A lower portion of each pivot arm 134 is coupled to opposing sides of the rear end of brake pawl 128 by pivot pins 138. Thus the rear end of the brake pawl is coupled to the cartridge so as to pivot about pin 136. As can best be seen in FIG. 9, the rear end of the brake pawl may include opposing flanges or ears 140 which extend on either side of the blade. Pivot pins 138 are mounted in opposing flanges 140. Optionally, the brake pawl may be shaped to minimize its mass as illustrated in dash lines in FIG. 9. It will be appreciated that minimizing the mass of the brake pawl minimizes the time required to move the brake pawl into contact with the blade for a given spring.

Second pivotal coupling assembly 132 includes a pair of pivot arms 142, one disposed on either side of brake pawl 128. The lower portion of each pivot arm 142 is coupled to the cartridge by a pivot pin 144 so that the pivot arm pivots about pin 144 relative to the cartridge. An upper portion of each pivot arm 142 is coupled to the front end of brake pawl 128 by a pivot pin 146. Thus, the front end of the brake pawl is coupled to the cartridge so as to pivot about pin 146.

As best seen in FIG. 8, brake pawl 128 is movable from a nominal or unactuated position (as indicated in solid lines) to an actuated position (as indicated in dash lines) in engagement with the blade. As discussed above, the angular momentum of the blade tends to urge the brake pawl in a clockwise direction (as seen in FIG. 8) about the arbor. As the brake pawl moves in a clockwise direction, the first and second pivotal coupling assemblies pull the brake pawl more tightly into the blade. Thus, when the brake pawl is moved to the actuated position, it binds against the blade and prevents the blade from rotating.

Exemplary reaction subsystem 24 also includes a biasing mechanism in the form of a spring 148 configured to urge the brake pawl from the unactuated position to the actuated position in contact with the blade. Spring 148 is compressed between a plunger member 150 and a shoulder region 152 on brake pawl 128. Plunger member 150 is connected to a retaining arm 154 that extends through spring 148 and shoulder region 152. Both plunger member 150 and shoulder region 152 include spindle structures 156 adapted to be received in the center of spring 148 to retain the spring in alignment with the plunger member and shoulder region.

The end of retaining arm 154 opposite plunger member 150 includes a cross bar 158 that extends generally perpendicular to the retaining arm. When the reaction subsystem is in an unactuated condition, cross bar 158 is retained away from shoulder region 152 by a pivotal brace 160. The upper end of pivotal brace 160 is adapted to receive and hold cross bar 158, while the lower end of the pivotal brace is supported against a ledge structure 162 on brake pawl 128. As shown in FIG. 8, pivotal brace 160 is pivotal against ledge structure 162 to release cross bar 158, thereby releasing retaining arm 154 and plunger member 150 to move away from shoulder region 152 under the urging of spring 148. The plunger member is coupled to an upper portion of at least one of pivot arms 134 by one or more pivot pins 164. In alternative embodiments, pivotal brace 160 may be pivotally connected to the brake pawl and/or the cartridge.

When retaining arm 154 is released, spring 148 expands between shoulder region 152 and plunger member 150. As a result, the front end of the brake pawl is pivoted in a clockwise direction about pin 144, while the rear end of the brake pawl is pivoted in a counter-clockwise direction about pin 136. In other words, the spring is configured to urge the first and second pivot coupling assemblies in opposite directions, thereby simultaneously urging the front and rear portions of the brake pawl toward the blade. It is believed that the configuration depicted in FIG. 8, in which the spring is arranged to apply opposing forces at opposite ends of the brake pawl, provides a mechanical advantage over alternative arrangements in which the spring force is applied at only a single end of the brake pawl. In any event, the spring urges the brake pawl into contact with the blade, which then cuts into the brake pawl and pulls the brake pawl further into the blade until the rotation of the blade is stopped. In the exemplary embodiment, brake pawl 128 is constructed of aluminum. Alternatively, brake pawl 128 may be constructed of any suitable material such as described above and in the incorporated references.

As described above, plunger member 150 and retaining arm 154 are held in a cocked or unactuated position until contact between the user's body and the blade is detected. Exemplary reaction subsystem 24 includes a restraining mechanism in the form of a fusible member 166 adapted to hold cross bar 158 in a cocked position within the upper end of pivotal brace 160. Suitable fusible members are described in more detail above and in the incorporated references. As illustrated in FIG. 8, fusible member 166 holds the cross bar at a position such that retaining arm 154 forms an acute angle with pivotal brace 160. As a result, a substantial portion of the force required to hold spring 148 in compression is provided by ledge structure 162. The remainder of the force required to hold the spring is provided by the fusible member. It will appreciated that the proportion of the force provided by the ledge structure to the force provided by the fusible member will depend on the angle between the retaining arm and the pivotal brace. Nevertheless, the angle between retaining arm 154 and pivotal brace 160 ensures that the pivotal brace will pivot upward to release the cross bar once the fusible member is melted.

Fusible member 166 may be configured in any of a variety of different ways. In the exemplary embodiment, the fusible member is configured as a fusible wire loop passed over cross bar 158. One end of the fusible wire loop is anchored to a central support mount 168, while the opposite end of the loop is anchored to a pair of spaced-apart lateral support mounts 170. As illustrated by dash lines in FIG. 11, central support mount 168 and/or lateral support mounts 170 may optionally include notches or similar structures to hold the wire loop in place.

As best seen in FIG. 10, the fusible wire loop passes over the cross bar twice, thereby distributing the tensile load over the wire. Indeed, the particular configuration depicted in FIG. 10 distributes the total upward force on the cross bar to four different sections of the wire loop. It is believed that each section of fusible wire 166 will bear one fourth of the total upward force on cross bar 158. Alternatively, the fusible wire may be passed over the cross bar additional times to further decrease the tensile load on each section of the wire.

Exemplary reaction subsystem 24 also includes a release mechanism in the form of a firing subsystem 172 configured to receive an activation signal when a dangerous condition is detected, and to rapidly melt fusible member 166. Examples of suitable firing subsystems are described in more detail above and in the incorporated references. Typically, the firing subsystem includes a charge storage device such as a capacitor 174 mounted onto a circuit board or other substrate 176. Circuit board 176 usually includes suitable circuitry (not shown) configured to discharge the capacitor through a pair of spaced-apart electrodes 178 that extend outward from the circuit board.

As shown in FIG. 10, circuit board 176 is positioned so that electrodes 178 are in contact with a portion of fusible wire loop 166. Thus, the fusible wire loop forms a conductive path between the electrodes. When capacitor 174 is discharged to the electrodes, the charge from the capacitor passes through and melts the fusible member. Typically, the electrodes are arranged spaced closely together to focus the charge in a small area of the fusible member. Optionally, the brake pawl or other portion of the brake mechanism may include suitable structure to hold the electrodes in firm contact with the fusible wire. In the exemplary embodiment, the brake pawl includes an incline support base 180 adapted to allow the circuit board and electrodes to be easily pressed into contact with, and held against, the fusible wire. As shown, the electrodes may be pressed against the fusible wire sufficiently to at least slightly deflect the wire, thereby ensuring continuous positive contact between the electrodes and fusible wire. Alternatively, the electrodes may be arranged in a variety of other ways to melt the fusible wire.

In the exemplary embodiment depicted in FIG. 8, firing subsystem 172 is mounted within cartridge 80. A portion of circuit board 176 extends out the cartridge to engage a connector 182 coupled to interior housing 108. Alternatively, connector 182 may be configured to extend through a hole in the cartridge to engage the circuit board. In any event, connector 182 is coupled to a control subsystem (not shown). Thus, when cartridge 80 is slid into engagement with the interior housing, the circuit board automatically engages the connector, thereby coupling capacitor 174 and the other circuitry to the control subsystem. No further connection between the control subsystem and the firing subsystem is necessary. Likewise, the circuit board automatically disengages the connector when the cartridge is slid backward off the interior housing. Typically, the control subsystem is configured to disable the motor assembly unless the circuit board is in engagement with the connector (i.e., the cartridge is in place). In alternative embodiments, the firing subsystem may be connected to the control subsystem in any other way such as cables, etc.

Figure 12:
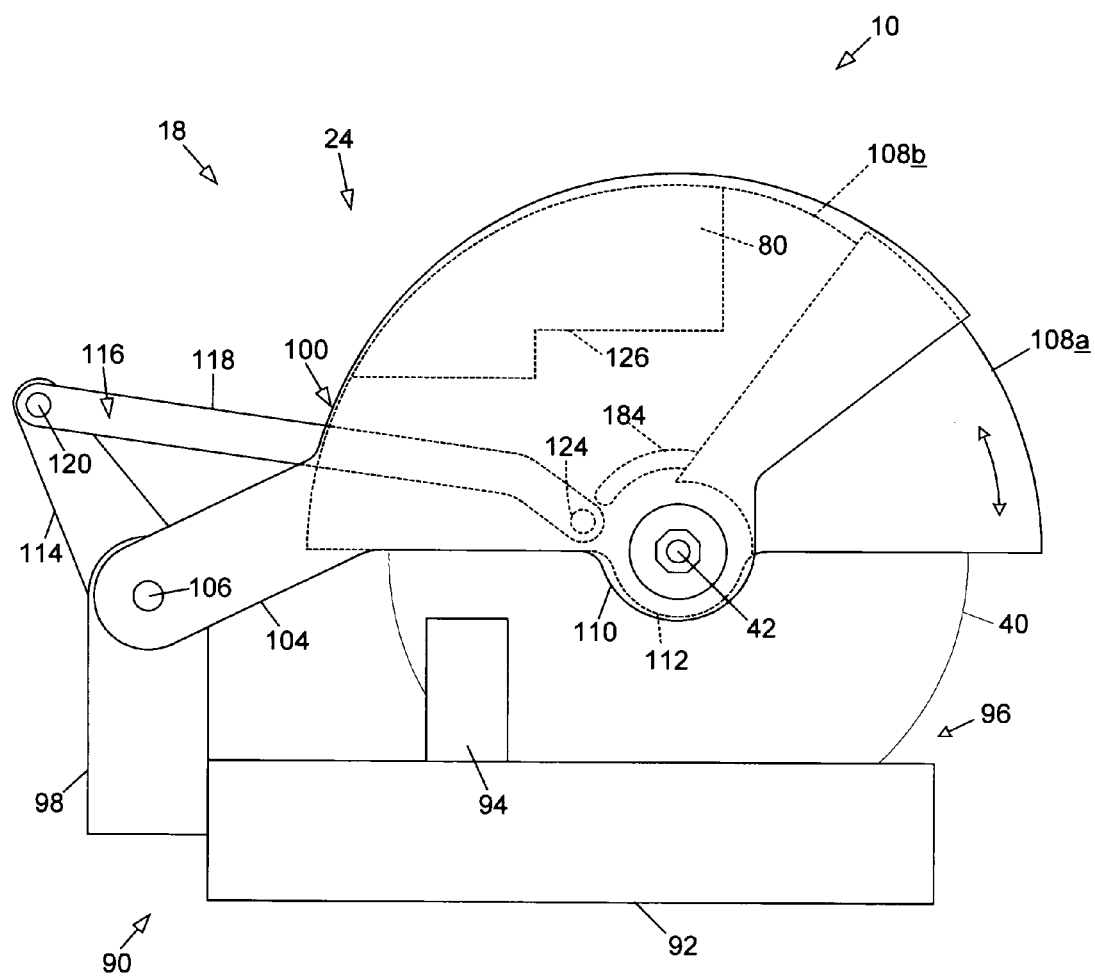
FIG. 12 is a schematic side elevation of another exemplary miter saw having a further alternative safety system configured to stop both the rotation and downward movement of the blade.

As described above, the present disclosure provides a miter saw which is substantially safer than existing saws. The miter saw includes a safety system 18 adapted to detect the occurrence of a dangerous condition and stop movement of the blade and/or the pivot arm to prevent serious injury to a user. While several particular exemplary embodiments have been described and illustrated, it will be appreciated that many different modifications and alterations may be made within the scope of the disclosure. As one example, FIG. 12 shows a further alternative embodiment in which interior housing 108 includes a front section 108a pivotally coupled to a rear section 108b by a arcuate channel 184 or similar mechanism. Cartridge 80 and linkage assembly 116 are coupled to rear section 108b. At least a portion of front section 108a is selectively pivotal backward around rear section 108b to expose more of blade 40. As with many existing blade guards which can be pivoted backward to expose the blade, front section 108a allows a user to view more of the blade when necessary for a particular operation. As a further example of the many different modifications and alterations possible, miter saw 10 may be configured as a compound miter saw, such as are known to those of skill in the art.

Alternatively, the safety system described herein may be adapted for use on a variety of other saws in addition to miter saws. Several examples of such other saws, as well as further detailed descriptions of miter saws may be found in the following references, the disclosures of which are herein incorporated by reference: PCT Patent Application Serial No. PCT/US00/26812, filed Sep. 29, 2000, U.S. Provisional Patent Application Ser. No. 60/273,177, filed Mar. 2, 2001, U.S. Provisional Patent Application Ser. No. 60/233,459, filed Sep. 18, 2000, U.S. Provisional Patent Application Ser. No. 60/225,210, filed Aug. 14, 2000, U.S. Provisional Patent Application Ser. No. 60/225,058, filed Aug. 14, 2000, U.S. Provisional Patent Application Ser. No. 60/225,057, filed Aug. 14, 2000, and U.S. Provisional Patent Application Ser. No. 60/157,340, filed Oct. 1, 1999.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A miter saw comprising:
   a base assembly defining a cutting zone;
   a circular blade supported by the base assembly;
   a motor configured to rotate the blade;
   a housing assembly coupled to the base assembly and configured to at least partially enclose the blade, where the housing assembly includes a blade guard movable between an extended position relatively proximal the cutting zone and a retracted position relatively distal the cutting zone; and
   a reaction system configured to detect one or more dangerous conditions between a person and the blade, and to urge the blade guard toward the extended position in the event a dangerous condition is detected.

2. The miter saw of claim 1, where the blade guard is configured to move around the perimeter of the blade.

3. The miter saw of claim 1, further comprising a linkage assembly connecting the blade guard to the base assembly, and where the housing assembly is selectively movable toward and away from the cutting zone, and where the linkage assembly is configured to move the blade guard toward the extended position when the housing assembly is moved away from the base assembly.

4. A miter saw comprising:
   a base assembly defining a cutting zone;
   a circular blade supported by the base assembly;
   a motor configured to rotate the blade;
   a housing assembly coupled to the base assembly and configured to at least partially enclose the blade, where the housing assembly includes a blade guard movable between an extended position relatively proximal the cutting zone and a retracted position relatively distal the cutting zone; and
   a reaction system configured to detect one or more dangerous conditions between a person and the blade, and to urge the blade guard toward the extended position in the event a dangerous condition is detected;
   where the reaction system includes a brake mechanism configured to stop rotation of the blade, and where at least a portion of the brake mechanism is coupled to the blade guard.

5. The miter saw of claim 4, where the brake mechanism includes a cartridge removably attached to the blade guard.

6. The miter saw of claim 5, where the blade guard includes an exterior surface, and where the cartridge forms a portion of the exterior surface of the blade guard when the cartridge is attached to the blade guard.

7. The miter saw of claim 5, where the brake mechanism includes at least one braking element configured to engage the blade, and where the braking element is coupled to the cartridge.

8. The miter saw of claim 4, where the blade has angular momentum when rotating, and where the brake mechanism includes at least one braking element configured to engage the blade and to transfer at least a portion of the angular momentum of the blade to the blade guard.

9. A miter saw comprising:
   a base assembly defining a cutting zone;
   a circular blade supported by the base assembly;
   a motor configured to rotate the blade;
   a housing assembly coupled to the base assembly and configured to at least partially enclose the blade, where the housing assembly includes a blade guard movable between an extended position relatively proximal the cutting zone and a retracted Position relatively distal the cutting zone; and
   a reaction system configured to detect accidental contact between a person and the blade and to urge the blade guard toward the extended position in the event contact is detected.

* * * * *